United States Patent Office 2,985,916
Patented May 30, 1961

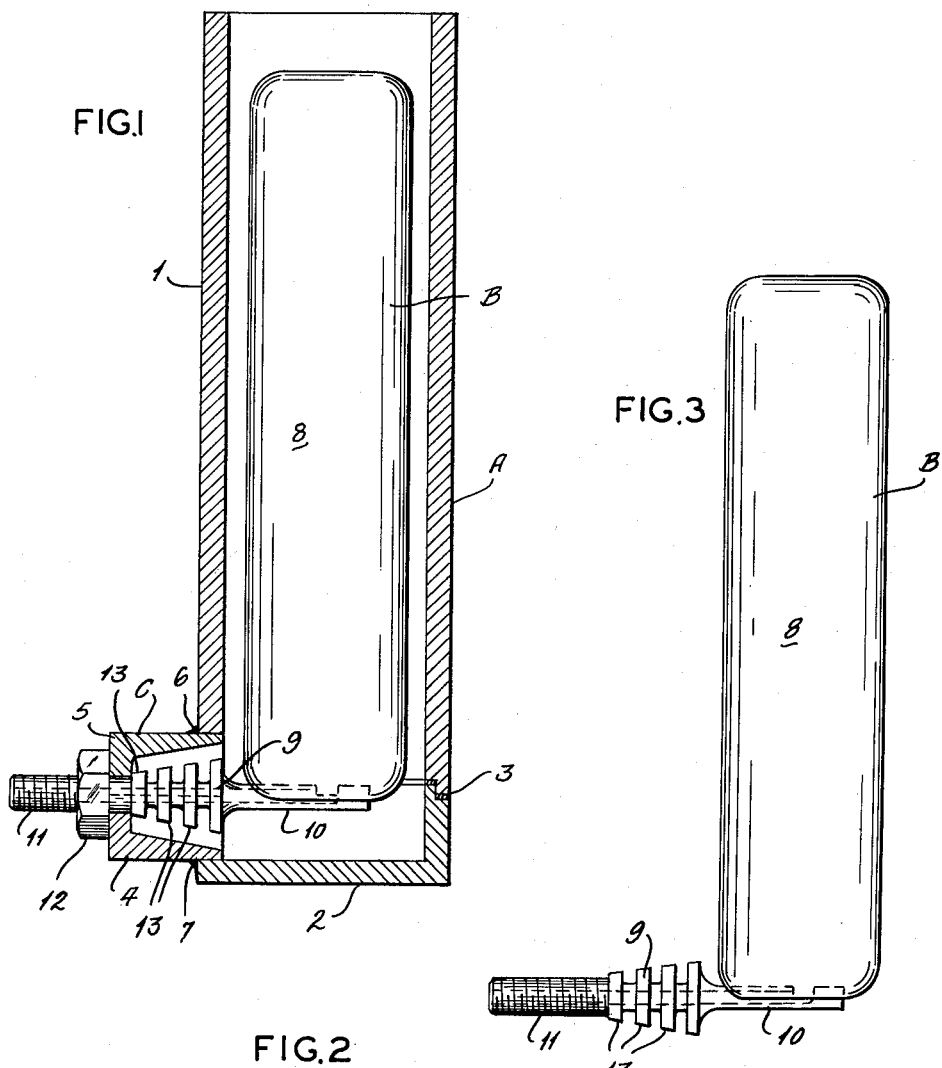
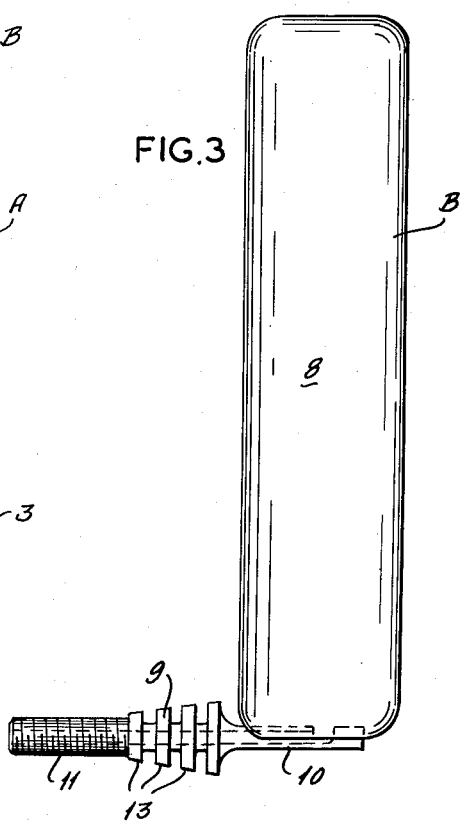
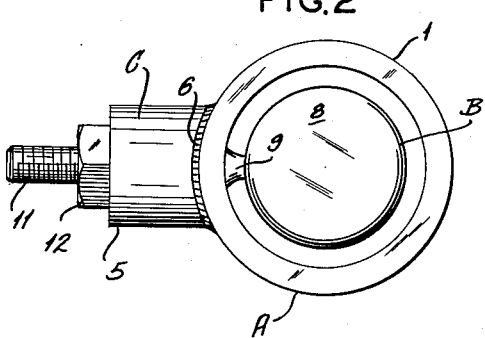

2,985,916
METHOD AND MOLD FOR MAKING SEAMLESS POLYURETHANE CONTAINERS

Franz Gottfried Reuter, Lemforde, Hannover, and Heinrich Kordes, Osnabruck, Germany, assignors, by mesne assignments, to Mobay Chemical Company, Pittsburgh, Pa., a corporation of Delaware Filed Mar. 19, 1957, Ser. No. 647,155

Claims priority, application Germany Mar. 22, 1956

4 Claims. (Cl. 18—39)

This invention relates to a process as well as a mold for making elastic containers.

It is an object of the present invention to provide elastic containers which can be used to store and handle compressed gases and liquids. Another object of the invention is to provide elastic containers for gases and liquids which are suitable for use in the manufacture of hydraulic, pneumatic and hydropneumatic devices and equipment of all kinds. A further object of the invention is to provide elastic containers for gases and liquids which are capable of withstanding high pressures and exhibit outstanding resistance to abrasion and aging. A further object of the invention is to provide elastic containers made of a material that does not corrode under the action of the gases or liquids to be stored or handled therein and which is elastic enough to permit a change of the volume within a wide range. A further object of the invention is to provide a process and a mold for making such elastic containers. Other objects will become apparent from the following description with reference to the accompanying diagrammatic drawing in which Figure 1 is a side view of the mold used in the process of the invention, Figure 2 is a cross-sectional view of the mold used in the process of the invention, and Figure 3 is a side elevation of the core and the attached tubular passageway of the mold used in the practice of the invention.

In accordance with this invention, generally speaking, the foregoing objects and others are accomplished by providing containers made of a cast polyurethane rubber. This polyurethane rubber imparts to the containers of the instant invention elasticity, impermeability, outstanding resistance to abrasion, aging and chemicals, including oils, and exceptional structure strength as well as impact strength.

In accordance with the instant invention, containers of the above-described characteristics are obtained by pouring a reactive polyurethane composition capable of forming a cast polyurethane rubber when heated into a mold of suitable shape and dimensions, said mold comprising a shell, a core and a housing attached to said shell, said housing being adapted to hold in position a tubular fluid passageway, said passageway supporting said core, said passageway and said core being sealed fluid-tight together, and said core being disposed coaxially with said shell. When pouring a reactive polyurethane composition into such a mold, the inner walls thereof will define the exterior shape of the container to be produced, while interior shape of the container will be determined by the shape of the core. The space between the mold and the core will define the walls of the final container, and the tubular fluid passageway will be connected with the container on the side where it was attached to the core of the mold. After pouring the reactive polyurethane composition into the space between mold and core, it is subjected to a heat treatment to thereby effect curing and conversion of the reactive polyurethane composition into a cast polyurethane rubber. The container thus produced is taken out of the mold and finally the core, enclosed by the container, is destroyed by the application of pressure, such as compression or inflation.

The process of the invention makes it possible, for the first time, to mold the hollow bodies desired in one piece and to avoid seams, adhesive bonds or welds which considerably lessen the total strength. For this reason, a hollow body made according to the process of this invention, so far as it is enclosed on all sides by a sufficiently strong shell, can be subjected to internal pressures of several hundred atmospheres without any difficulty and for long periods.

The core of the mold used in the practice of the invention is preferably prepared from a well solderable metal sheet and of such character that it can easily be destroyed by the application of pressures above one atmosphere. In order to seal the core fluid-tight to the tubular passageway, the two parts are preferably bonded by means of soft solder. Moreover, it has proven advantageous to sandblast the surface of the tubular passageway to be surrounded by the cast polyurethane rubber and to subsequently prime it with a conventional isocyanate adhesive prior to the casting process in order to effect an intimate bond between the metal of the tubular passageway and the cast polyurethane rubber.

In order to avoid with certainty any shift of the core in the mold shell, particularly with long hollow bodies, it may be advantageous to center the upper part of the core in the mold by means of fitting pieces which are removed again before the end of the molding operation. As the cross-linking progresses, the plastic stiffens rather quickly so that it can take over the function of the aforesaid fitting pieces, namely the exact centering of the nucleus.

The cast polyurethane rubber serving as the building material of the containers of the instant invention must have specific properties in order to make them suitable for use in modern hydraulic and pneumatic devices. Thus, under no circumstances may the material undergo plastic deformation even under extremely high pressures. In addition, the modulus of elasticity must not be too high. In other words, the material must be sufficiently soft to change its shape with even a slight change of the pressure in the interior. These requirements can be met by producing the cast polyurethane rubber serving as the construction material of the containers of the invention from a reactive polyurethane composition derived from a substantially linear hydroxyl polyester, an organic diisocyanate and a cross-linking agent (chain extender). In preparing such a reactive polyurethane composition, the hydroxyl polyester is reacted at elevated temperature with excess diisocyanate and the isocyanate-modified polyester thus produced is heated with the cross-linking agent in such an amount as to reduce the free isocyanato groups contained in the isocyanate-modified polyester to at most zero. This process is described in detail in U.S. Patent 2,729,618 to K. E. Müller, the disclosure of which is incorporated herein by reference. For the purposes of the instant invention, a small amount of a surface active agent, such as an alkali salt of a fatty acid, a higher alkyl sulfonate or an alkyl aryl sulfate, is added to the isocyanate-modified polyester or its components in order to produce a polyurethane rubber of optimum characteristics.

Referring more particularly to the drawings, the mold illustrated in Figures 1 and 2 comprises the shell A and the core B. The shell A is formed by a tubular top part 1 and a lower part 2. The alignment of these two parts is maintained by the tongue-and-groove joint 3 which is located at the dividing line of the mold. As may be seen from Figure 1, this dividing line coincides with the axis of the housing C supporting the tubular passageway 9. This tubular passageway serves as an inlet or outlet for the liquid or gas to be stored or handled in the container and will be described in greater detail hereinbelow. The housing C is formed by the two half shells 4 and 5 which are joined at 6 and 7 to the upper part 1 and the lower part 2, respectively. In order to hold the mold parts A, B and C together, a screwed collar or the like, not shown in the drawings, may be placed around the lower part of the mold. Also, the housing C may be shaped slightly conically and half shells 4 and 5 secured against loosening by a ring or collar placed over them.

Within the mold A, C, which determines the contours of the hollow body to be produced, there is located hollow core B consisting of a thin metal sheet, such as brass foil, and having its self-supporting cylindrical part 8 in the same axis as the upper part 1 of the shell A. The exact position of the core B is determined by the tubular passageway 9 which, in the area of its end piece 10, is connected fluid-tight with soft solder to the core B and screwed to housing C by means of thread 11 and nut 12. On the other side of the housing, the tubular passageway 9 is secured by the foremost of the flange-like parts 13 which form a kind of spiral and are designed to firmly anchor the passageway in the wall of the container.

Prior to the molding operation, the tubular passageway, already soldered to the core B, is sand-blasted and coated with a commercial isocyanate adhesive in order to obtain a completely secure, durable and fluid-tight seal between metal and polyurethane rubber. Then, the core B is inserted in the mold shell A and held and centered by screwing down the nut 12. Mold and core are more precisely the inner surface of the upper part 1, lower part 2 and half shells 4 and 5 and the outer surface of the core B are treated before assembling, with a conventional release agent in order to prevent the polyurethane rubber from sticking to these parts.

After the subsequent preheating of the assembled mold in an oven to about 160° C., the reactive polyurethane composition is poured into the mold from above, care being taken that no bubbles are formed. During the casting operation, an upward thrust results which can cause the core to shift. In order to prevent this and to hold the core in its central position, adjusting pieces, not shown in the drawings, can be inserted in the upper part of the mold. These adjusting pieces are removed before the liquid polyurethane composition reaches the level at which they are mounted, set by cross-linkage and takes over the role of supporting material. After the mold has been filled to the brim or to the desired height, it is returned to the oven and kept there, preferably at temperatures between 100° and 120° C. until the reactive polyurethane composition has been completely converted into polyurethane rubber by curing and cross-linking. Subsequently, the container produced is taken out of the mold, this being done in the reverse order of assembling the mold. Finally, the core B now enclosed by the container is destroyed either by compression (application of a pressure from the outside) or by inflation (such as by blowing in a fluid).

Although the invention is described in detail in the foregoing, modifications can be made by those skilled in the art without departing from the spirit or scope of the invention except as set forth in the claims.

The polyurethane plastic is prepared from about 1,000 parts by weight of a linear polyester obtained by thermal esterification of adipic with ethylene glycol and having a molecular weight of about 2,000 an hydroxyl number of about 50 and an acid number of about 1 heated at about 135° C. at less than atmospheric pressure and preferable at a pressure approaching a vacuum for about one hour until substantially all the moisture has been removed. Then 0.1 part sodium-salt of stearic-acid has to be added to this polyester. About 180 parts by weight naphthylene-1,5-diisocyanate are next introduced into the mixture and reaction is brought about by allowing the mixture to set for about 10 minutes while the pressure in the reaction vessel is less than atmospheric. About 14 parts 1,4-butanediol and 8 parts of trimethylole-propane are added within about 1 minute, while stirring the mixture vigorously. The resulting mixture is poured into a suitable mold and maintained at about 110° C. for about 24 hours or until the polyurethane plastic has cured into a rubber-like polyurethane plastic of the desired size and shape for hollow body.

What is claimed is:

1. A method of making a seamless polyurethane rubber container which comprises placing a hollow metal core adapted to be destroyed by the application of pressures above about one atmosphere and having a tubular fluid conduit bonded thereto to form a fluid-tight seal, said tubular fluid conduit communicating with the interior of said core, within a mold shell having a housing in the wall thereof adapted to receive said conduit, positioning said metal core in coaxial spaced-apart relation with said mold shell by attaching said tubular fluid conduit to said housing, the portion of said tubular fluid conduit which communicates with the interior of the mold being coated with an isocyanate adhesive, forming a liquid reactive polyurethane composition about said hollow metal core, curing said liquid reactive polyurethane composition to form a solid substantially nonporous polyurethane plastic with only the tubular fluid conduit in communication between the metal core and the exterior, removing said housing and said mold shell and destroying said metal core by the application of pressure above about one atmosphere.

2. A method of making a seamless polyurethane rubber container which comprises forming a liquid reactive polyurethane composition in a mold comprising a hollow metal core, a mold shell and a housing, said metal core comprising a solderable metal adapted to be destroyed by the application of pressures above about one atmosphere, said housing being in the wall of said mold shell and adapted to hold said mold shell and said metal core in coaxial spaced-apart relation by holding in position during the forming of said reactive polyurethane composition about said metal core, a tubular fluid conduit attached to said metal core and said housing and positioned to permit the passage of fluid through the interior thereof from the outside of said housing to the inside of said metal core, the portion of said tubular fluid conduit which communicates with the interior of said mold in contact with said liquid reactive polyurethane composition being coated with an isocyanate adhesive prior to forming said liquid reactive polyurethane composition about said core and bonded to said metal core to form a fluid-tight seal therebetween, curing said liquid reactive polyurethane composition to form a solid substantially nonporous polyurethane plastic completely surrounding said metal core with only the tubular fluid conduit in communication between the metal core and the exterior, the nonporous polyurethane plastic covering the portion of the barrel of the tubular fluid conduit which had been coated with isocyanate adhesive, removing said housing and said mold shell and destroying said metal core by the application of pressure above about one atmosphere.

3. The method of claim 2 wherein said core is destroyed by fluid pressure.

4. A mold for the production of seamless polyurethane rubber containers which comprises a mold shell, a hollow metal core and a housing, the metal core comprising a solderable metal adapted to be destroyed by the application of pressures above about one atmosphere, said housing being in the wall of said mold shell and adapted to hold said mold shell and said metal core in coaxial spaced-apart relation by a tubular fluid conduit bonded to said metal core by a fluid-tight seal and communicating with the interior of said metal core and being detachably connected to said housing.

References Cited in the file of this patent
UNITED STATES PATENTS

| | | |
|---|---|---|
| 1,163,987 | Eggers | Dec. 14, 1915 |
| 1,166,862 | Smoot | Jan. 4, 1916 |
| 1,583,464 | Houskeeper | May 4, 1926 |
| 2,136,432 | Gattuso | Nov. 15, 1938 |
| 2,217,734 | Dreyfus | Oct. 15, 1940 |
| 2,280,074 | Halsall | Apr. 21, 1942 |
| 2,505,807 | Stott | May 2, 1950 |
| 2,641,292 | Quillinan | June 2, 1953 |
| 2,717,422 | Rowe et al. | Sept. 13, 1955 |
| 2,730,765 | Crafton et al. | Jan. 17, 1956 |
| 2,741,800 | Brockway | Apr. 17, 1956 |
| 2,865,079 | Marchioli et al. | Dec. 23, 1958 |